R. T. GRIFFITHS.
PLAYING BALL AND METHOD OF MAKING THE SAME.
APPLICATION FILED FEB. 28, 1917.
1,240,438.
Patented Sept. 18, 1917.
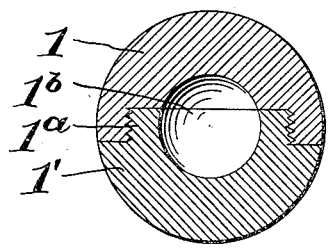
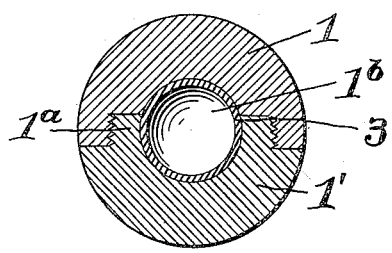
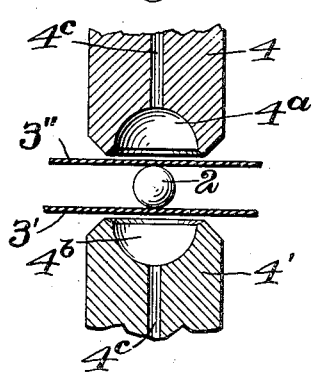
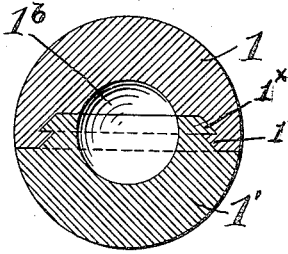
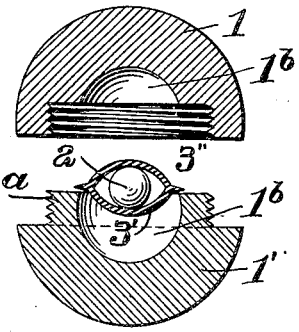
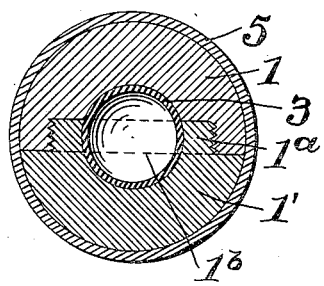
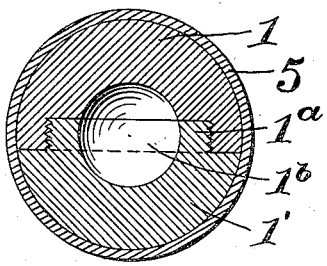
Inventor:
Richard T. Griffiths,
Attys.

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

PLAYING-BALL AND METHOD OF MAKING THE SAME.

1,240,438.  Specification of Letters Patent.  Patented Sept. 18, 1917.

Application filed February 28, 1917. Serial No. 151,614.

*To all whom it may concern:*

Be it known that I, RICHARD T. GRIFFITHS, a citizen of the United States, and resident of Akron, Ohio, have invented certain new and useful Improvements in Playing-Balls and Methods of Making the Same, of which the following is a specification.

My present invention relates to improvements in the manufacture of hollow resilient playing balls, of which I may mention as an example golf and billiard balls.

The invention aims to provide an economical and efficient method of manufacturing such balls preferably with gas under pressure in the interior thereof, and in which all liability of the escape of such gas from the interior will be prevented.

The invention also resides in the article produced by such method.

I have illustrated my invention by the aid of the accompanying drawings, in which—

Figure 1 is a transverse sectional view of a ball embodying my invention.

Figs. 2, 3 and 4 are similar views of modifications.

Fig. 5 is a sectional detail illustrating a method of forming an expansible liner containing an expansible material to be contained within the hollow ball, and Fig. 6 is a sectional view showing the two ball forming sections about to be brought together to inclose such expansible lining.

Fig. 7 is a sectional view showing a modification of my invention showing interlocking devices other than screw threads.

Referring first to Fig. 1, I form or shape by any suitable means a pair of cup-shaped sections 1 and 1', which, when united, will form a spherical ball having within the same a spherical cavity 1$^b$. In order to unite these parts I shape them so that they may be brought together with an interlocking action, and, as shown in Fig. 1, this may be accomplished by providing one section with a male threaded portion 1$^a$ adapted to be screwed into a correspondingly threaded recess or female portion in the other section. Where it is desired that the ball shall be an inflated ball, I insert within the cavity 1$^b$ before the sections are brought together, a material capable of gasifying under heat. A material extremely desirable for this purpose is one which will give off a gas which is absolutely inert to the relation of the material of which the ball is formed, and a material suitable for this purpose is one which will generate nitrogen, such for example as ammonium nitrite, or a mixture of sodium nitrite and ammonium chlorid.

My improved method of forming the ball by interlocking sections enables the gas producing material to be readily inserted, and for the purpose of preventing any leakage of the gas between the sections of the ball, I coat one or both of the interlocking parts of the sections before they are brought into interlocking engagement with a suitable cement. In case the sections are formed of vulcanizable material, such for example as rubber, I would prefer to use a rubber cement which may be of a character adapted to be vulcanized by the action of the heat which is used to gasify the material within the hollow interior. If the sections are made of nonvulcanizing material any suitable cement may be used according to the character of materials employed for the sections.

Where the sections are formed of vulcanizable material, I prefer to form the halves or sections 1 and 1' in suitable molds and vulcanize them therein to such an extent that the material is only set up or semi-cured, and thereafter coat the interlocking portions with a rubber cement and then screw or force the sections together by the use of molds or sections having a spherical cavity slightly smaller than the exterior spherical surface of the completed ball, it being understood that in this semi-cured condition the sections are still somewhat flexible so that the interlocking portions may be readily forced into interlocking engagement.

Where the ball is inflated or subjected to internal pressure by the gas produced in the manner hereinbefore referred to, the cement will seal the joint between the sections and prevent the escape of the gas, but I may provide an internal sealing means in the shape of an inner lining 3 of expansible material, such as sheet rubber, as indicated in Fig. 2. A convenient manner of forming this lining with its contained expansible material is illustrated in Fig. 5, in which I place between two sheets of lining material, such as a vulcanizable rubber compound, a pellet 2 of the gasifying material, hereinbefore referred to, of a size determined by the amount of internal pressure desired.

By the use of opposed dies 4 and 4' the edges of the sheets may be brought together and caused to adhere about the pellet, due to the adhesive nature of the unvulcanized sheets. If these sheets are of disk form the resulting article will be as indicated at 3', 3" and 2 in Fig. 6, but the dies may be conveniently formed to not only secure the edges together but also to sever them from larger sheets, as indicated in Fig. 5, which will avoid the necessity for preliminary cutting of the circular disks. At the same time that the two sections of the die are brought together to clamp and join the edges of the disks, I may draw said disks into the cup-shaped recesses 4ª and 4ᵇ by means of passages 4ᶜ, which may be connected in any suitable manner with suction apparatus.

The expansible envelop having been formed in the manner described and inserted in the cavity in one of the sections, as indicated in Fig. 6, the two sections are brought together as hereinbefore described, and being subsequently subjected to heat as previously explained, the gasifying of the pellet causes the envelop 3 to be expanded within the spherical interior of the ball, as shown in Figs. 2 and 3. The dies 4 and 4' may be inserted in any suitable machine, such as an ordinary punching press, not necessary to be illustrated herein.

The balls shown in Figs. 1 and 2 may be sold as complete articles or they may have molded thereabout an inclosing cover 5, as indicated in Figs. 3 and 4, which cover may be gutta percha, celluloid, imitation ivory or other composition according to the purposes for which the ball is designed.

If desired the ball shown in Figs. 1, 2, 3, and 4 may be provided with any desired surface ornamentation, such as is common in golf or billiard balls, and where the outer covering 5 is used, the outer surfaces of the hemispherical sections may be roughened or pitted to interlock with the outer covering 5.

Instead of making the inner coating 3 of disks united about the pellet, I may, if desired, form such envelop in the shape of a complete sphere of rubber and thereafter inject into the same a liquid capable of gasifying to produce the necessary internal pressure.

In Fig. 7 I have shown interlocking connections of a different form, one section having a male portion provided with an annular beveled flange 1ˣ designed to be forced into the correspondingly shaped recess in the opposing section, the elasticity of the material permitting said flange to pass by the flange 1ʸ and expand into the recess in rear thereof.

What I claim is:—

1. The herein described method of forming a playing ball of plastic material which consists in molding a pair of hemi-spherical sections, one having a threaded projection, and the other a correspondingly threaded recess, and thereafter screwing said parts together.

2. The herein described method of forming a playing ball which consists in shaping two hemi-spherical sections of vulcanizable plastic material with parts adapted to interlock against separation to form a complete sphere, partially vulcanizing said sections, bringing them into interlocking engagement, and thereafter completing the vulcanization.

3. The herein described method of forming a playing ball which consists in shaping two hemi-spherical sections of suitable material provided respectively with male and female threaded portions, coating said threads with adhesive, and screwing said sections together to complete the sphere.

4. The herein described method of manufacturing a playing ball which consists in shaping two hollow hemi-spherical sections of vulcanizable plastic material having parts adapted to interlock against separation, partially vulcanizing said sections, applying a vulcanizable cement to said interlocking parts, bringing said sections together and completing the vulcanization.

5. The herein described method of manufacturing a playing ball which consists in shaping two hollow hemi-spherical sections with parts interlocking against separation, providing means for hermetically sealing the joint between said sections when brought together, bringing said sections together with an inclosed material capable of gasifying under heat, and heating the article to gasify such material and vulcanize the parts together.

6. A playing ball comprising a pair of hollow hemi-spherical sections having interlocking parts, a gaseous material under pressure confined within said playing ball, and means for sealing the joint against escape of such gas.

7. A playing ball comprising a pair of hollow hemi-spherical sections having interlocking parts, a gaseous material under pressure confined within said playing ball, and means for sealing the joint against escape of such gas, comprising a spherical envelop lining the hollow interior of the ball.

In testimony whereof I affix my signature.

RICHARD T. GRIFFITHS.